United States Patent
Li et al.

(10) Patent No.: US 11,777,613 B2
(45) Date of Patent: Oct. 3, 2023

(54) POLARIZATION CHANGE TRACKING APPARATUS, PROCESSING APPARATUS FOR RECEIVED SIGNAL AND METHODS THEREOF

(71) Applicant: FUJITSU LIMITED, Kawasaki (JP)

(72) Inventors: Jingnan Li, Beijing (CN); Yangyang Fan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/564,736

(22) Filed: Dec. 29, 2021

(65) Prior Publication Data

US 2022/0255631 A1 Aug. 11, 2022

(30) Foreign Application Priority Data

Feb. 5, 2021 (CN) .......................... 202110159361.0

(51) Int. Cl.
*H04B 10/61* (2013.01)
*H04J 14/06* (2006.01)

(52) U.S. Cl.
CPC ..... *H04B 10/6166* (2013.01); *H04B 10/6162* (2013.01); *H04J 14/06* (2013.01)

(58) Field of Classification Search
CPC ............ H04B 10/6166; H04B 10/6162; H04B 10/6151; H04J 14/06
See application file for complete search history.

(56) References Cited

U.S. PATENT DOCUMENTS

| | | | |
|---|---|---|---|
| 2007/0092259 A1* | 4/2007 | Bontu ................ | H04B 10/6161 398/147 |
| 2011/0007232 A1 | 1/2011 | Shen et al. | |
| 2012/0275797 A1* | 11/2012 | Li .......................... | H04B 10/66 398/152 |
| 2015/0270921 A1 | 9/2015 | Jia et al. | |

(Continued)

FOREIGN PATENT DOCUMENTS

| | | |
|---|---|---|
| CN | 104935385 A | 9/2015 |
| CN | 107579780 A | 1/2018 |

(Continued)

OTHER PUBLICATIONS

X. Zhang et al., "Joint Polarization Tracking and Equalization in Real-Time Coherent Optical Receiver," in IEEE Photonics Technology Letters, vol. 31, No. 17, pp. 1421-1424, 1 Sep. 1, 2019, doi: 10.1109/LPT.2019.2929824. (Year: 2019).*

(Continued)

*Primary Examiner* — Nathan M Cors
(74) *Attorney, Agent, or Firm* — STAAS & HALSEY LLP

(57) ABSTRACT

A polarization change tracking apparatus, a processing apparatus for a received signal and methods thereof. The polarization change tracking method includes: estimating a polarization change speed in a link according to a received signal; setting a response coefficient of polarization tracking according to a relationship between an estimated polarization change speed and a predetermined value, to make a response of polarization tracking and a response of adaptive equalization be consecutive; and performing compensation for polarization change on the received signal according to a set response coefficient of polarization tracking.

9 Claims, 8 Drawing Sheets

(56) References Cited

U.S. PATENT DOCUMENTS

| | | | |
|---|---|---|---|
| 2016/0182182 A1* | 6/2016 | Schmogrow | H04B 10/6166 398/65 |
| 2020/0106521 A1 | 4/2020 | Ye et al. | |
| 2020/0264368 A1* | 8/2020 | Qi | H04B 10/0795 |
| 2022/0303012 A1 | 9/2022 | Takamuku et al. | |

FOREIGN PATENT DOCUMENTS

| | | |
|---|---|---|
| CN | 108173794 A | 6/2018 |
| CN | 109450552 A | 3/2019 |
| CN | 110224761 A | 9/2019 |
| CN | 110971294 A | 4/2020 |
| CN | 111711490 A | 9/2020 |
| JP | 2013-223128 | 10/2013 |
| WO | WO 2017/070826 A1 | 5/2017 |
| WO | WO 2020/255809 A1 | 12/2020 |

OTHER PUBLICATIONS

Cao Guoliang et al., Extended Kalman Based Polarization and Carrier Phase Quickly Tracking for PDM-16QAM, Acta Optaca Sinica, vol. 34 No. 12, Dec. 2014.
S. J. Savory, "Digital filters for coherent optical receivers," Optics Express, vol. 16, No. 2, pp. 804-817, 2008.
Office Action dated Jul. 27, 2023 in Chinese Patent Application No. 202110159361.0.

* cited by examiner

POLARIZATION CHANGE TRACKING APPARATUS, PROCESSING APPARATUS FOR RECEIVED SIGNAL AND METHODS THEREOF

CROSS-REFERENCE TO RELATED APPLICATIONS

This application is based on and hereby claims priority to Chinese Application No. 202110159361.0, filed Feb. 5, 2021, in the State Intellectual Property Office of China, the disclosure of which is incorporated herein by reference.

TECHNICAL FIELD

This disclosure relates to the field of communication technologies.

BACKGROUND

Coherent optical communication systems take an important role in communication transmission networks due to their huge transmission bandwidths, great potentials for expansion, extremely low transmission loss, and low costs. In coherent optical communication systems, polarization multiplexing techniques may increase communication capacities.

Currently, for a coherent optical receiver, adaptive equalization (AEQ) is usually used to achieve polarization demultiplexing. Commonly used AEQ algorithms, such as a constant modulus algorithm (CMA) and a decision-directed least mean square (DD-LMS) algorithm, may usually handle dozens to hundreds of krads of rotation of state of polarization (RSOP) in a link. When an optical fiber link is affected by lightning strikes, etc., fast RSOP of a magnitude of Mrad will be generated, and a performance of AEQ will be significantly reduced. When there exist both RSOP and polarization dependent loss (PDL) in the link, the total polarization change will be very complicated, and the performance of AEQ will be further reduced. Therefore, it is necessary to track fast polarization changes in the link. The most easy way to track fast polarization changes is to increase an AEQ update rate.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided a polarization change tracking apparatus, the apparatus including a processor configured to: estimate a polarization change speed in a link according to a received signal; set a response coefficient of polarization tracking according to a relationship between an estimated polarization change speed and a predetermined value, to make a response of polarization tracking and a response of adaptive equalization be consecutive; and perform compensation for polarization change on the received signal according to the set response coefficient of polarization tracking.

According to an embodiment of this disclosure, there is provided a processing apparatus for a received signal, the processing apparatus including: the polarization change tracking apparatus as described in this disclosure; and an adaptive equalizer configured to perform adaptive equalization processing on the polarization changed compensated received signal to obtain an adaptive equalization processed signal.

According to an embodiment of this disclosure, there is provided an optical receiver, including the apparatus as described in this disclosure.

According to an embodiment of this disclosure, there is provided a polarization change tracking method, the method including: estimating a polarization change speed in a link according to a received signal; setting a response coefficient of polarization tracking according to a relationship between an estimated polarization change speed and a predetermined value, to make a response of polarization tracking and a response of adaptive equalization be consecutive; and performing compensation for polarization change on the received signal according to the set response coefficient of polarization tracking.

According to an embodiment of this disclosure, there is provided a processing method for a received signal, the method including: estimating a polarization change speed in a link according to a received signal; setting a response coefficient of polarization tracking according to a relationship between an estimated polarization change speed and a predetermined value, to make a response of polarization tracking and a response of adaptive equalization be consecutive; performing compensation for polarization change on the received signal according to the set response coefficient of polarization tracking; and performing adaptive equalization processing on the polarization changed compensated received signal to obtain an adaptive equalization processed signal.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
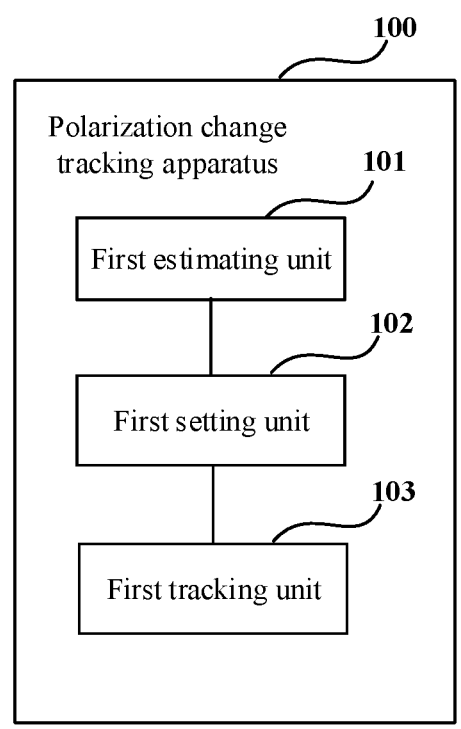
FIG. 1 is schematic diagram of the polarization change tracking apparatus according to an embodiment of this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

It was found by the inventors that a method for tracking fast polarization changes by increasing an AEQ update rate results in excessive performance cost.

In order to solve at least one of the above problems, embodiments of this disclosure provide a polarization change tracking apparatus, a processing apparatus for a received signal and methods thereof, in which response coefficients for polarization tracking are set according to a relationship between an estimated polarization change speed and a predetermined value, to make responses to the polarization tracking and responses of adaptive equalization be consecutive. Thus, fast polarization changes may be tracked and degradation of performance of the system may be avoided.

An advantage of the embodiments of this disclosure exists in that the response coefficient of polarization tracking is set according to a relationship between an estimated polarization change speed and a predetermined value, so that a response of polarization tracking and a response of adaptive equalization are consecutive. Thus, fast polarization changes may be tracked and degradation of performance of the system may be avoided.

Embodiment 1

The embodiment of this disclosure provides a polarization change tracking apparatus, for example, the apparatus is provided at an optical receiver end of an optical communication system. The apparatus may be integrated into an optical receiver, or may be provided as a separate apparatus.

FIG. 1 is schematic diagram of the polarization change tracking apparatus of Embodiment 1 of this disclosure. As shown in FIG. 1, a polarization change tracking apparatus 100 includes:

a first estimating unit 101 configured to estimate a polarization change speed in a link according to a received signal;

a first setting unit 102 configured to set a response coefficient of polarization tracking according to a relationship between an estimated polarization change speed and a predetermined value, to make a response of polarization tracking and a response of adaptive equalization be consecutive; and a first tracking unit 103 configured to perform compensation for polarization change on the received signal according to a set response coefficient of polarization tracking.

In this way, the response coefficient of polarization tracking is set according to a relationship between an estimated polarization change speed and a predetermined value, so that a response of polarization tracking and a response of adaptive equalization are consecutive. Thus, fast polarization changes may be tracked and degradation of performance of the system may be avoided.

In the embodiment of this disclosure, the link generally refers to an optical link.

In the embodiment of this disclosure, the tracking of the polarization change may also be referred to as compensation for a polarization change.

In the embodiment of this disclosure, the first estimating unit 101 estimates the polarization change speed in the link according to the received signal, and it may use an existing method or the following method to estimate the polarization change speed.

Figure 2:
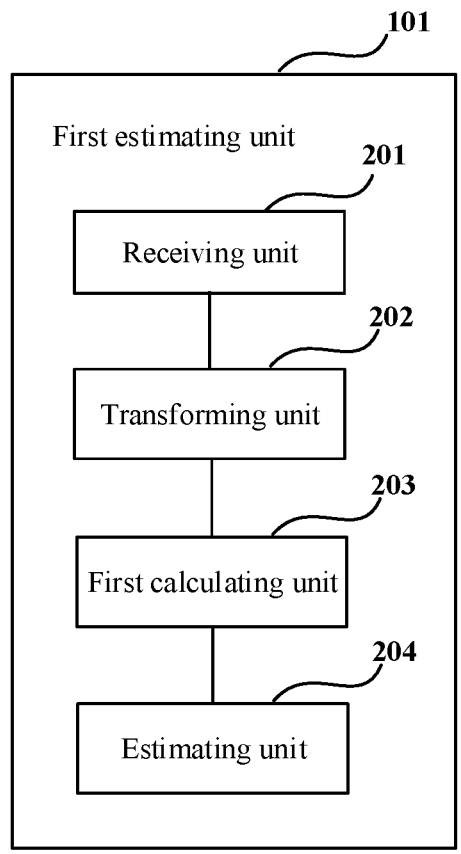
FIG. 2 is a schematic diagram of the first estimating unit according to an embodiment of this disclosure.

FIG. 2 is a schematic diagram of the first estimating unit of Embodiment 1 of this disclosure. As shown in FIG. 2, the first estimating unit 101 includes:

a receiving unit 201 configured to receive a received signal after a transmit signal is propagated via a link, pilot signals being inserted in the transmit signal, and the pilot signals being located on a plane in a Stokes space;

a transforming unit 202 configured to transform pilot signals in the received signal from a Jones space into the Stokes space to obtain Stokes vectors of the pilot signals;

a first calculating unit 203 configured to calculate a first polarization change matrix of the pilot signals according to the Stokes vectors of the pilot signals; and an estimating unit 204 configured to estimate a polarization change speed of the link according to the first polarization change matrix.

A process of estimating the polarization change speed by the first estimating unit 101 shall be exemplarily described below.

In the embodiment of this disclosure, a transmit signal is transmitted by a transmitter of the communication system, and pilot signals, also referred to as pilot symbols, are inserted into the transmit signal.

In the embodiment of this disclosure, the pilot signals may be various types of pilot signals. For example, the pilot signals are dual-polarization (DP) quadrature phase shift keying (QPSK) pilot signals. The pilot signals of the DP-QPSK type may be expressed as follows in the Jones space:

$$\begin{bmatrix} E_x(t) \\ E_y(t) \end{bmatrix} = \frac{1}{\sqrt{2}} \begin{bmatrix} e^{j\varphi_x(t)} \\ e^{j\varphi_y(t)} \end{bmatrix} = \frac{1}{\sqrt{2}} \begin{bmatrix} e^{j(k_x(t)\frac{\pi}{2} - \frac{\pi}{4})} \\ e^{j(k_y(t)\frac{\pi}{2} - \frac{\pi}{4})} \end{bmatrix}, \quad (1)$$

$$k_{x,y} \in [1, 2, 3, 4];$$

where, t denotes a time, and $k_{x,y}$ corresponds to four QPSK constellation points in two polarization states.

The pilot signals are transformed from the Jones space into the Stokes space by using a formula as below:

$$S(t) = \begin{bmatrix} S_0(t) \\ S_1(t) \\ S_2(t) \\ S_3(t) \end{bmatrix} = \begin{bmatrix} E_x(t)E_x^*(t) + E_y(t)E_y^*(t) \\ E_x(t)E_x^*(t) - E_y(t)E_y^*(t) \\ E_x(t)E_y^*(t) + E_y(t)E_x^*(t) \\ j(E_x(t)E_y^*(t) - E_y(t)E_x^*(t)) \end{bmatrix}; \quad (2)$$

where, $S_0$ is signal power, and $S_1$, $S_2$ and $S_3$ are three-dimensional coordinates of the signals in the Stokes space.

Putting formula (1) into formula (2) may obtain the Stokes vectors of the transmitted pilot signals:

$$S_{T,k}(t) = \begin{bmatrix} S_{0,T,k}(t) \\ S_{1,T,k}(t) \\ S_{2,T,k}(t) \\ S_{3,T,k}(t) \end{bmatrix} = \begin{bmatrix} 1 \\ 0 \\ \cos(k(t)\frac{\pi}{2} - \frac{\pi}{2}) \\ \sin(k(t)\frac{\pi}{2} - \frac{\pi}{2}) \end{bmatrix}, \quad (3)$$

$$k \in [1, 2, 3, 4];$$

where, k denotes four types of pilot signals in the Stokes space.

Figure 3:
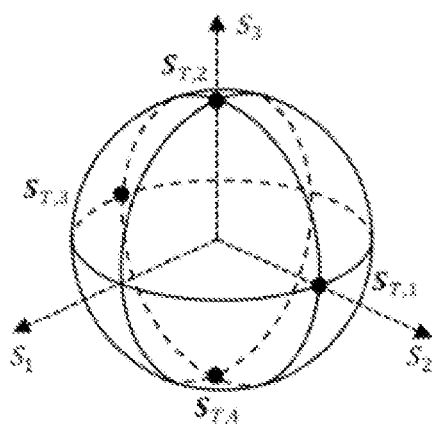
FIG. 3 is a schematic diagram of the Stokes vectors of the transmitted pilot signals according to an embodiment of this disclosure.

FIG. 3 is a schematic diagram of the Stokes vectors of the transmitted pilot signals of Embodiment 1 of this disclosure. As shown in FIG. 3, the four types of pilot signals are four intersections of a Poincare sphere surface and an S2 axis and an S3 axis, and are located in the same plane in the Stokes space.

As the pilot signals are affected by rotation of state of polarization (RSOP), a polarization dependent loss (PDL) and amplified spontaneous emission (ASE) in the link, the signal is received at the receiver end. For example, the received signal may be expressed as:

$$\begin{bmatrix} R_x(t) \\ R_y(t) \end{bmatrix} = T(t) \begin{bmatrix} E_x(t) \\ E_y(t) \end{bmatrix} e^{j\Delta\omega t} e^{j\varphi(t)} + n(t); \quad (4)$$

where, $\Delta\omega$ is a frequency offset between an optical carrier and a receiver optical local oscillator (LO), $\varphi(t)$ is a phase noise, $n(t)$ is an ASE noise, and $T(t)$ is a total link response containing the RSOP and PDL.

In the embodiment of this disclosure, the pilot signals in the received signal are transformed from the Jones space to the Stokes space to obtain the Stokes vectors of the pilot signals.

For example, putting formula (4) into formula (2) may obtain the Stokes vectors of the received pilot signals:

$$S_{R,k}(t) = \begin{bmatrix} S_{0,R,k}(t) \\ S_{1,R,k}(t) \\ S_{2,R,k}(t) \\ S_{3,R,k}(t) \end{bmatrix}, \quad (5)$$

$$k \in [1, 2, 3, 4];$$

where, k denotes four types of pilot signals in the Stokes space.

In this way, effects of the frequency offset and the phase noise may be eliminated.

Figure 4:
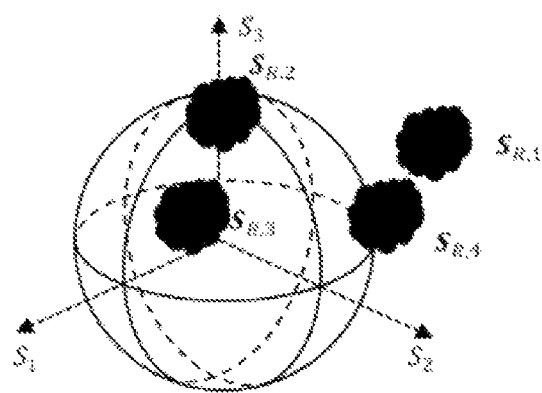
FIG. 4 is a schematic diagram of the Stokes vectors of the received pilot signals according to an embodiment of this disclosure.

FIG. 4 is a schematic diagram of the Stokes vectors of the received pilot signals of Embodiment 1 of this disclosure. As shown in FIG. 4, on the one hand, due to the effects of the RSOP and PDL, the received pilot signal is offset from its original position; and on the other hand, due to the effect of the ASE, the received pilot signals are dispersive.

As the transmitted pilot signals are known at the receiver end, classification averaging may be performed on it, so as to eliminate the effect of the ASE noise.

For example, Stokes vectors of the four types of pilot signals after being classification averaged are:

$$\overline{S_{R,k}}(t) = \begin{bmatrix} \overline{S_{1,R,k}}(t) \\ \overline{S_{2,R,k}}(t) \\ \overline{S_{3,R,k}}(t) \end{bmatrix} = \begin{bmatrix} \frac{1}{T}\sum_{t-T/2}^{t+T/2} S_{1,R,k}(t) \\ \frac{1}{T}\sum_{t-T/2}^{t+T/2} S_{2,R,k}(t) \\ \frac{1}{T}\sum_{t-T/2}^{t+T/2} S_{3,R,k}(t) \end{bmatrix}, \quad (6)$$

$$k \in [1, 2, 3, 4];$$

where, T is an average time.

Figure 5:
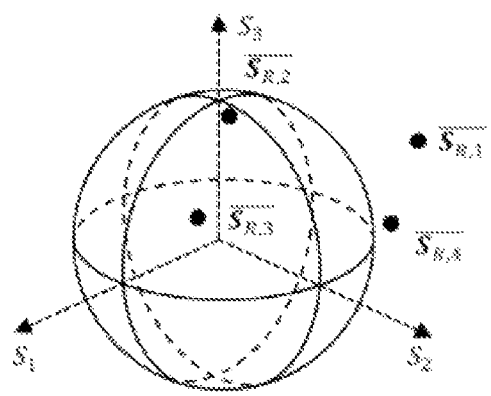
FIG. 5 is a schematic diagram of the classification averaged pilot signals according to an embodiment of this disclosure.

FIG. 5 is a schematic diagram of the classification averaged pilot signals of Embodiment 1 of this disclosure. As shown in FIG. 5, a Stokes vector $\overline{S_{R,k}}$ of the pilot signals after being classification averaged is obtained.

Figure 6:
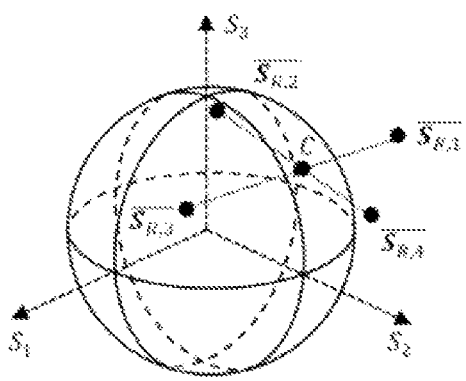
FIG. 6 is a schematic diagram of a barycenter of the pilot signals according to an embodiment of this disclosure.
Figure 7:
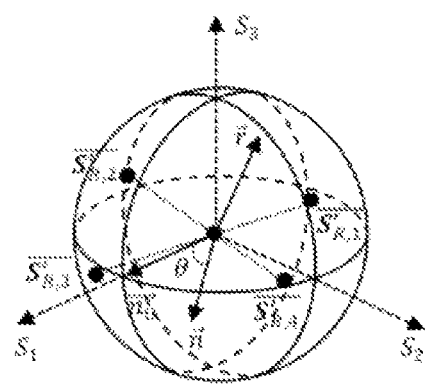
FIG. 7 is a schematic diagram of the PDL-compensated pilot signals according to an embodiment of this disclosure.
Figure 8:
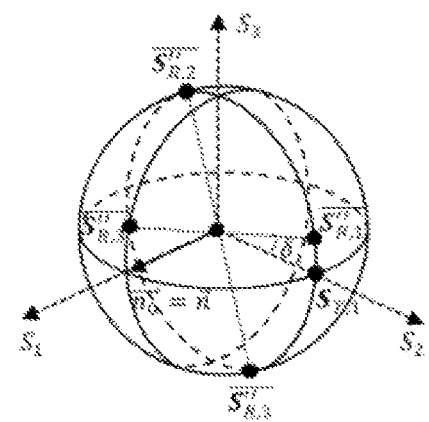
FIG. 8 is a schematic diagram of the four types of pilot signals recovered to the S2-S3 plane according to an embodiment of this disclosure.

FIG. 6 is a schematic diagram of a barycenter of the pilot signals of Embodiment 1 of this disclosure, FIG. 7 is a schematic diagram of the PDL-compensated pilot signals of Embodiment 1 of this disclosure, and FIG. 8 is a schematic diagram of the four types of pilot signals recovered to the S2-S3 plane of Embodiment 1 of this disclosure.

In the embodiment of this disclosure, the four types of pilot signals after being classification averaged are further averaged to obtain barycentric coordinates C(t) of a current pilot signal, as shown in FIG. 6:

$$C(t) = \begin{bmatrix} C_1(t) \\ C_2(t) \\ C_3(t) \end{bmatrix} = \begin{bmatrix} \frac{1}{4}\sum_{k=1}^{4} \overline{S_{1,R,k}}(t) \\ \frac{1}{4}\sum_{k=1}^{4} \overline{S_{2,R,k}}(t) \\ \frac{1}{4}\sum_{k=1}^{4} \overline{S_{3,R,k}}(t) \end{bmatrix}. \quad (7)$$

In this case, a PDL estimation matrix may be obtained:

$$M_{PDL}(t) = U_2\left(-\frac{\pi}{2}\right)D(-C_3(t))U_2\left(\frac{\pi}{2}\right)U_3\left(-\frac{\pi}{2}\right)D(-C_2(t))U_3\left(\frac{\pi}{2}\right)D(C_1(t)); \quad (8)$$

where, $U_2$ and $U_3$ respectively denote rotational matrices $$U_2(\sigma) = \begin{bmatrix} \cos(\sigma/2) & j\sin(\sigma/2) \\ j\sin(\sigma/2) & \cos(\sigma/2) \end{bmatrix}$$

and $$U_3(\chi) = \begin{bmatrix} \cos(\chi/2) & -\sin(\chi/2) \\ \sin(\chi/2) & \cos(\chi/2) \end{bmatrix}$$

rotating clockwise about the S2 axis and rotating counter-clockwise about the S3 axis. The PDL is compensated in the Stokes space, i.e. the barycentric coordinates C(t) of the four types of pilot signals are directly moved to the origin. In this case, the Stokes vectors of the four types of pilot signals are:

$$\overline{S'_{R,k}}(t) = \begin{bmatrix} \overline{S'_{1,R,k}}(t) \\ \overline{S'_{2,R,k}}(t) \\ \overline{S'_{3,R,k}}(t) \end{bmatrix} = \overline{S_{R,k}}(t) - C(t) = \begin{bmatrix} \overline{S_{1,R,k}}(t) \\ \overline{S_{2,R,k}}(t) \\ \overline{S_{3,R,k}}(t) \end{bmatrix} - \begin{bmatrix} C_1(t) \\ C_2(t) \\ C_3(t) \end{bmatrix}, \quad (9)$$

$$k \in [1, 2, 3, 4].$$

The PSL-compensated pilot signals are as shown in FIG. 7. A plane normal vector of adjacent two types of pilot signals, such as the first type of pilot signal and the second type of pilot signal, may be obtained through cross-product and normalization processing:

$$\vec{n}(t) = \frac{\overline{S'_{R,1}}(t) \times \overline{S'_{R,2}}(t)}{|\overline{S'_{R,1}}(t) \times \overline{S'_{R,2}}(t)|} = \begin{bmatrix} n_1(t) \\ n_2(t) \\ n_3(t) \end{bmatrix}. \quad (10)$$

In the embodiment of this disclosure, the normal vector may be obtained through cross-product and normalization processing according to a pair of adjacent two types of pilot signals, or respective normal vectors may be obtained through cross-product according to multiple pairs of adjacent two types of pilot signals, and then the normal vector obtained through averaging and normalization processing.

A rotation axis and rotation angle of a normal vector are obtained according a unit vector $\vec{n}_0 = [1, 0, 0]^T$ and the plane normal vector n(t):

$$\vec{r}(t) = \frac{\vec{n}_0 \times \vec{n}(t)}{|\vec{n}_0 \times \vec{n}(t)|}, \quad (11)$$

$$\theta(t) = \arccos\left(\frac{\vec{n}_0 \cdot \vec{n}(t)}{|\vec{n}_0||\vec{n}(t)|}\right). \quad (12)$$

Thus, a rotation matrix of the normal vector in the Jones space is obtained:

$$U_{normal}(t) = \cos\left(\frac{\theta(t)}{2}\right)I + j\sin\left(\frac{\theta(t)}{2}\right)(\vec{r}(t) \cdot \sigma); \quad (13)$$

where, I is a unit matrix, and σ is a Pauli matrix.

A relationship of transformation of the polarization rotation in the Jones space and the Stokes space is:

$$U = \begin{bmatrix} u_1 & u_2 \\ -u_2^* & u_1^* \end{bmatrix} \to R = \begin{bmatrix} |u_1|^2 - |u_2|^2 & -2\mathrm{Re}(u_1 u_2^*) & -2\mathrm{Im}(u_1 u_2^*) \\ 2\mathrm{Re}(u_1 u_2) & \mathrm{Re}(u_1^2 - u_2^2) & \mathrm{Im}(u_1^2 + u_2^2) \\ -2\mathrm{Im}(u_1 u_2) & -\mathrm{Im}(u_1^2 - u_2^2) & \mathrm{Re}(u_1^2 + u_2^2) \end{bmatrix}. \quad (14)$$

Putting formula (13) into formula (14) may obtain its rotation matrix $R_{normal}(t)$ in the Stokes space, and $\overline{S_{R,k}}''(t) = [\overline{S_{1,R,k}}''(t), \overline{S_{2,R,k}}''(t), \overline{S_{3,R,k}}''(t)]$ is obtained by rotating the pilot signals. and in this case, the plane normal vector coincides with the unit vector $\overline{n}_0 = [1, 0, 0]^T$, and the four types of pilot signals are recovered into the S2-S3 plane, as shown in FIG. 8.

A rotation angle and a corresponding rotation matrix of the first type of pilot signal in the S2-S3 plane may be calculated according to a relationship between a current Stokes vector $\overline{S_{R,1}}''(t)$ of the first type of pilot signal and a transmitted Stokes vector $S_{T,1}(t)$ in the S2-S3 plane:

$$\delta(t) = \arctan\left(\frac{\overline{S_{3,R,1}}''(t)}{\overline{S_{2,R,1}}''(t)}\right), \quad (15)$$

$$U_{retarder}(t) = \begin{bmatrix} e^{j\frac{\delta(t)}{2}} & 0 \\ 0 & e^{-j\frac{\delta(t)}{2}} \end{bmatrix}. \quad (16)$$

Thus, an RSOP estimation matrix may be obtained:

$$U_{RSOP}(t) = U_{retarder}(t)U_{normal}(t) \quad (17).$$

In the embodiment of this disclosure, it can be seen from formula (14) that a period of the polarization rotation in the Stokes space is twice of that in the Jones space, hence, performing polarization estimation in the Stokes space may possibly introduce a phase jump into the Jones space, that is, $$U_{RSOP}(t) = \begin{bmatrix} e^{-j\frac{\varphi}{2}} & 0 \\ 0 & e^{j\frac{\varphi}{2}} \end{bmatrix} U_{RSOP}(t), \varphi = 0 \text{ or } 2\pi. \quad (18)$$

The phase jump causes that the RSOP estimation matrix is discontinuous. As the polarization rotation is a continuous physical process, polarization estimation should also be continuous. Assuming that a last polarization estimation is correct, a phase jump may occur in current polarization estimation. In this case, the RSOP estimation matrix may be expressed as:

$$U_{RSOP}(t-\Delta t) = \quad (19)$$

$$\begin{bmatrix} u_1(t-\Delta t) & u_2(t-\Delta t) \\ -u_2^*(t-\Delta t) & u_1^*(t-\Delta t) \end{bmatrix}^{-1} = \begin{bmatrix} u_1^*(t-\Delta t) & -u_2(t-\Delta t) \\ u_2^*(t-\Delta t) & u_1(t-\Delta t) \end{bmatrix},$$

$$U_{RSOP}(t) = \begin{bmatrix} e^{-j\frac{\varphi}{2}} & 0 \\ 0 & e^{j\frac{\varphi}{2}} \end{bmatrix} \begin{bmatrix} u_1(t) & u_2(t) \\ -u_2^*(t) & u_1^*(t) \end{bmatrix}^{-1} = \begin{bmatrix} u_1^*(t)e^{-j\frac{\varphi}{2}} & -u_2(t)e^{-j\frac{\varphi}{2}} \\ u_2^*(t)e^{j\frac{\varphi}{2}} & u_1(t)e^{j\frac{\varphi}{2}} \end{bmatrix}. \quad (20)$$

Whether a phase jump occurs may be determined by calculating elements in the current RSOP estimation matrix and the last time of estimation matrix, which is as follows:

$$\Delta = U_{RSOP,11}(t) \cdot conj(U_{RSOP,11}(t-\Delta t)) + \quad (21)$$
$$U_{RSOP,12}(t) \cdot conj(U_{RSOP,12}(t-\Delta t)) =$$
$$u_1^*(t)e^{-j\frac{\varphi}{2}} \cdot conj(u_1^*(t-\Delta t)) - u_2(t)e^{-j\frac{\varphi}{2}} \cdot conj(-u_2(t-\Delta t)) \approx$$
$$(|u_1^*(t)|^2 + |u_2(t)|^2)e^{-j\frac{\varphi}{2}} \approx \pm 1;$$

where, $U_{RSOP,11}$ and $U_{RSOP,12}$ respectively denote elements in line 1, column 1 and line 1, column 2, in the RSOP estimation matrix. When $\Delta \approx 1$, a phase jump does not occur; and when $\Delta \approx -1$, a phase jump occurs, and the RSOP estimation matrix is discontinuous. And in this case, the RSOP estimation matrix needs to be correct, and a corrected matrix is:

$$U_{phase\ jump} = \begin{bmatrix} e^{j\pi} & 0 \\ 0 & e^{-j\pi} \end{bmatrix}. \quad (22)$$

And the corrected RSOP estimation matrix is:

$$U_{RSOP}(t) = \begin{cases} U_{RSOP}(t) & \Delta \approx 1 \\ U_{phase\ jump} U_{RSOP}(t) & \Delta \approx -1 \end{cases}. \quad (23)$$

In the embodiment of this disclosure, when the PDL in the optical link is not negligible, the first determining unit 503 determines the polarization change matrix according to the PDL estimation matrix and the RSOP estimation matrix. For example, the RSOP estimation matrix is multiplied by the PDL estimation matrix to obtain a total polarization estimation matrix in the optical link, i.e. a first polarization change matrix of the pilot signals:

$$M_{total}(t) = U_{RSOP}(t) M_{PDL}(t) \quad (24);$$

where, $U_{RSOP}(t)$ denotes the RSOP estimation matrix, and $M_{PDL}(t)$ denotes the PDL estimation matrix.

In the embodiment of this disclosure, for the case where the PDL in the optical link is not negligible, the polarization change in the optical link is denoted by the total polarization estimation matrix, i.e. the polarization change matrix. The polarization change matrix is obtained through calculation by using formula (24).

According to polarization change matrices at different times, a differential matrix (i.e. a polarization change matrix between two estimation moments) may be obtained:

$$\Delta M(t) = M_{total}(t) \cdot M_{total}^{-1}(t-\Delta t) \quad (25).$$

As the PDL in the link is not negligible, normalization processing needs to be performed on the differential matrix:

$$\Delta M'(t) = \frac{\Delta M(t)}{\sqrt{\det(\Delta M(t))}}; \quad (26)$$

where, $\det(\cdot)$ denotes calculation of a determinant of the matrix.

A polarization rotation trajectory of the pilot signals is calculated according to the normalized differential matrix $\Delta M'(t)$:

$$\Delta l(t) = \sqrt{4 - 4\text{Re}(\Delta M_e'(t))^2} \quad (27);$$

where, $\Delta M_e'(t)$ is an element in the first row and first column, or an element in the second row and second column, in $\Delta M'(t)$, or an average value of the two elements.

Calculation of the polarization rotation angle of the pilot signals is continued according to the obtained polarization rotation trajectory $\Delta l(t)$:

$$\Delta \theta(t) = 2\arcsin\left(\frac{\Delta l(t)}{2}\right). \quad (28)$$

Finally, the polarization change speed of the optical link is obtained:

$$f_{Hz}(t) = \frac{f_{rad}(t)}{2\pi} = \frac{\Delta \theta(t)}{2\pi \Delta t}; \quad (29)$$

where, $\Delta \theta(t)$ is the polarization rotation angle of the pilot signals.

In the embodiment of this disclosure, for a case where the PDL in the optical link is negligible, the polarization change in the optical link may be obtained through calculation by using formula (23), and the polarization change speed in the optical link may be calculated by using formulae (25) and (27)-(29).

In the embodiment of this disclosure, after the first estimating unit 101 estimates the polarization change speed at the current moment in the link, the first setting unit 102 sets the response coefficient at the current time according to the relationship between the estimated polarization change speed and the predetermined value, so that the response of the polarization tracking is continuous with the response of adaptive equalization.

In the embodiment of this disclosure, the response coefficient of polarization tracking set by the first setting unit 102 is obtained based on the first polarization change matrix of the pilot signal.

In the embodiment of this disclosure, the response coefficient of the polarization tracking includes a first part adapted to the response of adaptive equalization and a second part adapted to a polarization change in the link. In this way, the polarization tracking is enabled to not only effectively track the fast polarization changes in the optical link, but also be adapted to adaptive equalization changing relatively slowly, thereby ensuring continuity of the entire system equalization.

In the embodiment of this disclosure, the predetermined value may be set as actually needed; for example, it may be determined according to a tracking capability of the adaptive equalization and a requirement on a code error rate when fast polarization changes occur.

Figure 9:
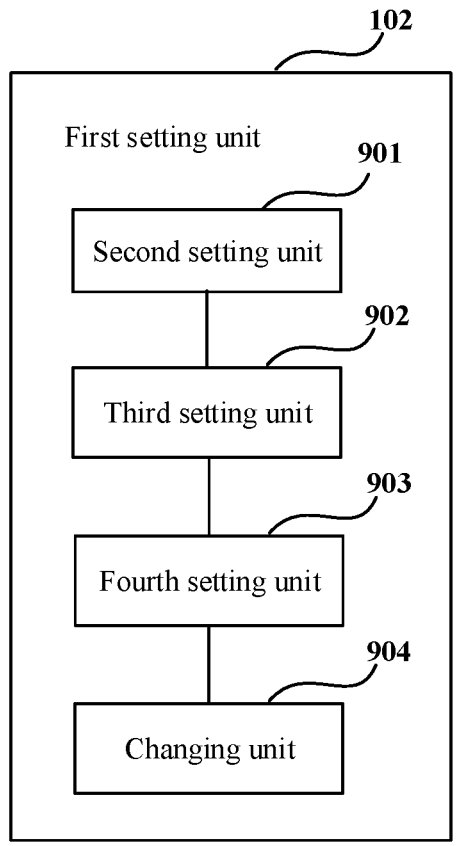
FIG. 9 is a schematic diagram of the first setting unit according to an embodiment of this disclosure.

FIG. 9 is a schematic diagram of the first setting unit of Embodiment 1 of this disclosure. As shown in FIG. 9, the first setting unit 102 includes:

a second setting unit 901 configured to set the response coefficient of the polarization tracking to be an initial coefficient of polarization tracking when the polarization change speed is less than the predetermined value;

a third setting unit 902 configured to set the response coefficient of polarization tracking to include the initial coefficient, a first link response coefficient and a second link response coefficient when the polarization change speed is increased to be greater than or equal to the predetermined value, the first link response coefficient being correlated to a moment when the polarization change speed is less than the predetermined value, and the second link response coefficient being correlated to a moment when the polarization change speed is increased to be greater than or equal to the predetermined value; and a fourth setting unit 903 configured to set the response coefficient of polarization tracking to include the initial coefficient, the first link response coefficient and a third link response coefficient when the polarization change speed is decreased to be less than the predetermined value, the third link response coefficient being correlated to a moment when the polarization change speed is decreased to be less than the predetermined value.

In the embodiment of this disclosure, for example, the first link response coefficient is an estimated value of a link response at the moment when the polarization change speed is less than the predetermined value, the second link response coefficient is an estimated value of a link response at the moment when the polarization change speed is increased to be greater than or equal to the predetermined value, and the third link response coefficient is an estimated value of a link response at the moment when the polarization change speed is decreased to be less than the predetermined value.

In the embodiment of this disclosure, the estimated value of the link response may be determined according to the first polarization change matrix.

For example, the estimated value of the link response is an inverse matrix of the first polarization change matrix.

A process of setting the response coefficient of polarization tracking at the current moment by the first setting unit 102 shall be exemplarily described below.

When the polarization change speed at the current moment is less than the predetermined value (referred to as stage 1 in the embodiment of this disclosure), the response coefficient of the polarization tracking is set to include the initial coefficient, the first link response coefficient, and the second link response coefficient; for example, the estimated polarization change speed being less than the predetermined value indicates that the adaptive equalization may track a current low-speed polarization change. In this case, polarization estimation is performed continuously, but the coefficient of polarization tracking is set to be of a fixed value. The total response of the system may be expressed as:

$$T_{total}(t_1) = M_{CMA}(t_1) \cdot M_{Fast}(t_1) \cdot T(t_1) = \{\hat{T}^{-1}(t_1)\hat{T}_{pre}^{-1}\} \cdot T_{pre} \cdot T(t_1) \quad (30);$$

where, $T(t_1)$ is the total link response including RSOP and PDL at the current moment $t_1$, and the polarization changes at a low speed; $M_{Fast}(t_1)$ denotes the response matrix of polarization tracking at the current moment $t_1$, i.e. the response coefficient, here, $M_{Fast}(t_1) = T_{pre}$, $T_{pre}$ being a unit matrix of 2×2 and being taken as an initial coefficient of the polarization tracking; and $M_{CMA}$ denotes the response of adaptive equalization at the current moment $t_1$, and is equal to an inverse $\hat{T}^{-1}(t_1)\hat{T}_{pre}^{-1}$ of the total link response and the polarization tracking response. In this case, the adaptive equalization compensates for all its former polarization changes, including the total link response and polarization tracking response.

When the polarization change speed at the current moment increases to be greater than or equal to the predetermined value (referred to as stage 2 in this embodiment), the response coefficient of the polarization tracking is set to include the initial coefficient, the first link response coefficient and the second link response coefficient; for example, the estimated polarization change speed being greater than or equal to the predetermined value indicates that the adaptive equalization is unable to track the current polarization change. In this case, the polarization estimation is performed continuously, and the response coefficient of the polarization tracking is updated to track the current fast polarization change and ensure continuity of system equalization. The total response of the system may be expressed as:

$$T_{total}(t_2) = M_{CMA}(t_2) \cdot (M_{Fast}(t_2) \cdot T(t_2)) = \{\hat{T}^{-1}(t_1)\hat{T}_{pre}^{-1}\} \cdot \{T_{pre}\hat{T}(t_1)\hat{T}^{-1}(t_2)\} \cdot T(t_2) \quad (31);$$

where, $T(t_2)$ is the total link response including RSOP and PDL at the current time $t_2$, and the polarization is changing fast; $M_{CMA}$ denotes the response of adaptive equalization at the current time $t_2$, here, as the adaptive equalization has a poor capability to track fast polarization changes, the coefficient of $M_{CMA}$ is still $\hat{T}^{-1}(t)T_{pre}^{-1}$; $M_{Fast}(t_2)$ denotes the response matrix of polarization tracking at current time t2, i.e. the response coefficient, and in a process of updating the polarization tracking coefficient, in order to ensure continuity of the entire system equalization, the response coefficient of the polarization tracking is not directly set to be of an inverse $\hat{T}^{-1}(t_2)$ of the estimated total link response, but needs to be specially set, namely, $T_{pre}\hat{T}(t_1)\hat{T}^{-1}(t_2)$. It can be seen that the coefficient setting realizes fast polarization tracking, and ensures the continuity of system equalization, that is, the response of fast polarization tracking and adaptive equalization is continuous.

At the current moment, when the polarization change speed decreases to be less than the predetermined value (referred to as stage 3 in the embodiment of this disclosure), the response coefficient of the polarization tracking is set to include the initial coefficient, the first link response coefficient and the third link response coefficient; for example, the estimated polarization change speed being lower than the predetermined value again indicates that the adaptive equalization may track the current polarization change. In this case, the coefficient of the fast polarization tracking is fixed again, and the polarization estimation is still continued. In this case, the total response of the system is:

$$T_{total}(t_3) = M_{CMA}(t_1) \cdot M_{Fast}(t_3) \cdot T(t_3) = \left\{\hat{T}^{-1}(t_1)\hat{T}_{pre}^{-1}\right\} \cdot \left\{T_{pre}\hat{T}(t_1)\hat{T}^{-1}(t_3)\right\} \cdot T(t_3) = \left\{\hat{T}^{-1}(t_1)\hat{T}_{pre}^{-1}\right\} \cdot T'_{pre} \cdot T(t_3); \quad (32)$$

where, $T_{pre}T(t_1)T^{-1}(t_3)$ is anew initial coefficient $T_{pre}'$ of the polarization tracking.

In the embodiment of this disclosure, as shown in FIG. 9, the first setting unit 102 may further include:

a changing unit 904 configured to, when the polarization change speed is decreased to be less than the predetermined value, change the response coefficient of the polarization tracking into the initial coefficient at a speed below a predetermined speed.

For example, for formula (32), the initial coefficient $T_{pre}'$ may be slowly changed into an initial coefficient $T_{pre}$ in a form of a unit matrix.

In the embodiment of this disclosure, at an initial stage of operation of the polarization change tracking apparatus, i.e., stage 1, the second setting unit 901 operates, when the polarization change speed increases to be greater than or equal to the predetermined value, i.e. stage 2, the third setting unit 902 works, and when the polarization change speed decreases to be lower than the predetermined value again, i.e., stage 3, the fourth setting unit 903 works. In addition, when the polarization change speed increases again to be greater than or equal to the predetermined value, it enters into stage 2 and the third setting unit 902 works, and when it decreases to be less than the predetermined value again, it enters into stage 3; and the operations are repeated in turn.

Figure 10:
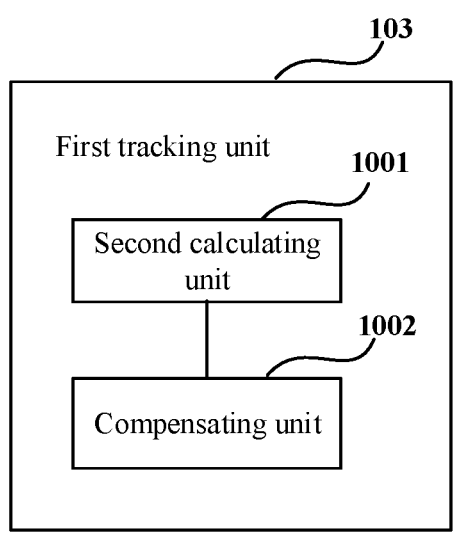
FIG. 10 is a schematic diagram of the first tracking unit according to an embodiment of this disclosure.

FIG. 10 is a schematic diagram of the first tracking unit of Embodiment 1 of this disclosure. As shown in FIG. 10, the first tracking unit 103 includes:

a second calculating unit 1001 configured to obtain a response coefficient of polarization tracking of a data signal in the transmit signal according to a set response coefficient of polarization tracking; and a compensating unit 1002 configured to perform compensation for polarization change on the received signal according to the set response coefficient of polarization tracking and the response coefficient of polarization tracking of the data signal in the transmit signal.

In the embodiment of this disclosure, the set response coefficient of the polarization tracking is obtained based on the first polarization change matrix of the pilot signal.

In the embodiment of this disclosure, the second calculating unit 1001 may determine the response coefficient of the polarization tracking of the data signal between the adjacent pilot signals according to the response coefficient of the polarization tracking set based on the adjacent pilot signals, or, determine the response coefficient of the polarization tracking of the data signal between the adjacent pilot signals according to the response coefficient of the polarization tracking set based on the former pilot signal in the adjacent pilot signals.

For example, the second calculating unit 1001 interpolates the two polarization tracking response coefficients set, i.e. elements of the response matrix, based on the adjacent pilot signals, so as to obtain elements of the response matrix of the polarization tracking of the data signal between the adjacent pilot signals, thereby obtaining a complete response matrix of the polarization tracking of the data signal between the adjacent pilot signals, i.e., the response coefficient of the polarization tracking of the data signal.

Or, for example, the second calculating unit 1001 directly uses two polarization tracking response matrices set based on the former pilot signal in the adjacent pilot signals as the polarization tracking response matrices of the polarization tracking of the data signal between the adjacent pilot signals, i.e., the response coefficient of the polarization tracking of the data signal.

In the embodiment of this disclosure, the compensating unit 1002 performs compensation for polarization change on the received signal according to the set response coefficient of polarization tracking and the response coefficient of polarization tracking of the data signal in the transmit signal; for example, for the pilot signals in the received signal, it performs compensation for polarization change on the received signal according to the set response coefficient of polarization tracking, and for the data signal in the received signal, it performs compensation for polarization change on the received signal according to the response coefficient of polarization tracking of the data signal.

It can be seen from the above embodiment that the response coefficient of polarization tracking is set according to a relationship between the estimated polarization change speed and the predetermined value, so that the response of polarization tracking and the response of adaptive equalization are consecutive. Thus, fast polarization changes may be tracked and degradation of performance of the system may be avoided.

Embodiment 2

The embodiment of this disclosure provides a processing apparatus for a received signal, including the polarization change tracking apparatus as described in Embodiment 1. Reference may be made to Embodiment 1 for a particular structure and functions of the polarization change tracking apparatus, which shall not be described herein any further.

Figure 11:
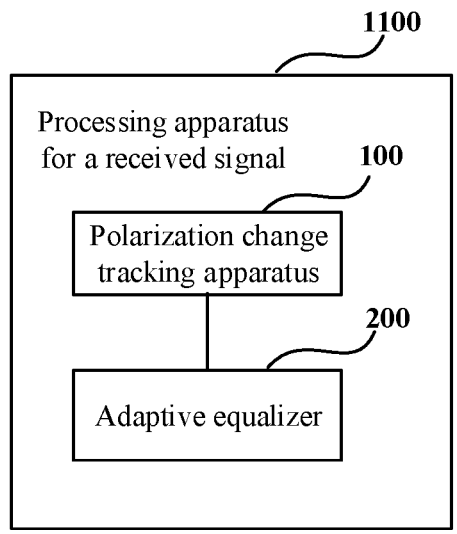
FIG. 11 is a schematic diagram of the processing apparatus for a received signal according to an embodiment of this disclosure.

FIG. 11 is a schematic diagram of the processing apparatus for a received signal of Embodiment 2 of this disclosure. As shown in FIG. 11, a processing apparatus 1100 for a received signal includes:

a polarization change tracking apparatus 100 configured to output a polarization changed compensated received signal; and an adaptive equalizer 200 configured to perform adaptive equalization processing on the polarization changed compensated received signal to obtain an adaptive equalization processed signal.

In the embodiment of this disclosure, a structure and functions of the polarization change tracking apparatus 100 are identical to those of the polarization change tracking apparatus in Embodiment 1, which shall not be described herein any further.

In the embodiment of this disclosure, the adaptive equalizer 200 may be an existing adaptive equalizer, such as a CMA adaptive equalizer.

It can be seen from the above embodiment that the response coefficient of polarization tracking is set according to a relationship between the estimated polarization change speed and the predetermined value, so that the response of polarization tracking and the response of adaptive equalization are consecutive. Thus, fast polarization changes may be tracked and degradation of performance of the system may be avoided.

Embodiment 3

The embodiment of this disclosure provides an optical receiver, including the polarization change tracking apparatus as described in Embodiment 1 or the processing apparatus for a received signal as described in Embodiment 2. Reference may be made to Embodiment 1 and Embodiment 2 for a particular structure and functions of the polarization change tracking apparatus or the processing apparatus for a received signal, which shall not be described herein any further.

Following description shall be given by taking that the optical receiver includes the processing apparatus for a received signal described in Embodiment 2 as an example.

Figure 12:
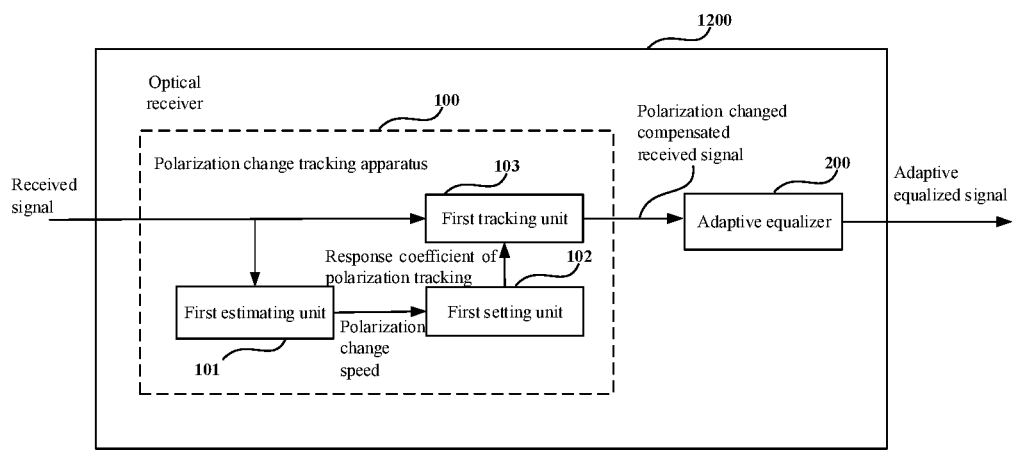
FIG. 12 is a block diagram of a systematic structure of the optical receiver according to an embodiment of this disclosure.

FIG. 12 is a block diagram of a system structure of the optical receiver according to Embodiment 3 of this disclosure. As shown in FIG. 12, an optical receiver 1200 includes the polarization change tracking apparatus 100 and the adaptive equalizer 200.

As shown in FIG. 12, the first estimating unit 101 estimates a polarization change speed in a link according to a received signal, the first setting unit 102 sets a response coefficient of polarization tracking according to a relationship between an estimated polarization change speed and a predetermined value, to make a response of polarization tracking and a response of adaptive equalization be consecutive, the first tracking unit 103 performs compensation for polarization change on the received signal according to a set response coefficient of polarization tracking, and the adaptive equalizer 200 performs adaptive equalization processing on the polarization changed compensated received signal to obtain an adaptive equalization processed signal.

In the embodiment of this disclosure, the optical receiver 1200 does not necessarily include all the components shown in FIG. 12; and furthermore, the optical receiver 1200 may include components not shown in FIG. 12, and reference may be made to related technologies for details.

In the embodiment of this disclosure, functions of the polarization change tracking apparatus or the processing apparatus for a received signal may be executed by a processor of the optical receiver; for example, they may be executed by a digital signal processor (DSP) of the receiver.

It can be seen from the above embodiment that the response coefficient of polarization tracking is set according to a relationship between the estimated polarization change speed and the predetermined value, so that the response of polarization tracking and the response of adaptive equalization are consecutive. Thus, fast polarization changes may be tracked and degradation of performance of the system may be avoided.

Embodiment 4

The embodiment of this disclosure provides a polarization change tracking method, corresponding to the polarization change tracking apparatus in Embodiment 1.

Figure 13:
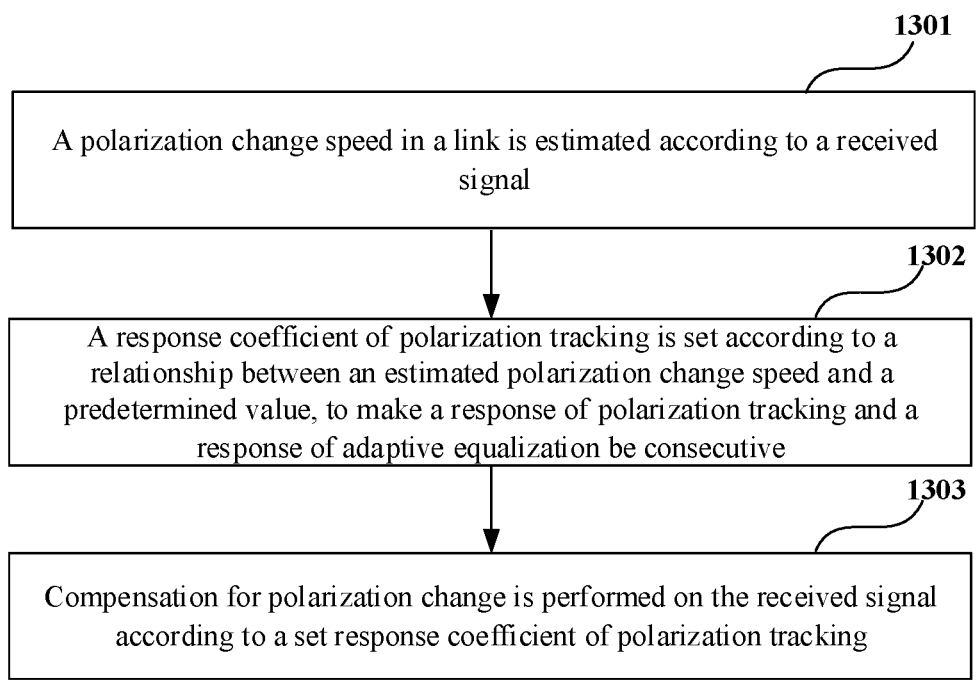
FIG. 13 is a schematic diagram of the polarization change tracking method according to an embodiment of this disclosure.

FIG. 13 is a schematic diagram of the polarization change tracking method of Embodiment 4 of this disclosure. As shown in FIG. 13, the method includes:

Operation 1301: a polarization change speed in a link is estimated according to a received signal;

Operation 1302: a response coefficient of polarization tracking is set according to a relationship between an estimated polarization change speed and a predetermined value, to make a response of polarization tracking and a response of adaptive equalization be consecutive; and Operation 1303: compensation for polarization change is performed on the received signal according to a set response coefficient of polarization tracking.

In this embodiment, reference may be made to implementations of the units in Embodiment 1 for execution of operations 1301-1303, which shall not be described herein any further.

It can be seen from the above embodiment that the response coefficient of polarization tracking is set according to a relationship between the estimated polarization change speed and the predetermined value, so that the response of polarization tracking and the response of adaptive equalization are consecutive. Thus, fast polarization changes may be tracked and degradation of performance of the system may be avoided.

Embodiment 5

The embodiment of this disclosure provides a processing method for a received signal, corresponding to the processing apparatus for a received signal in Embodiment 2.

Figure 14:
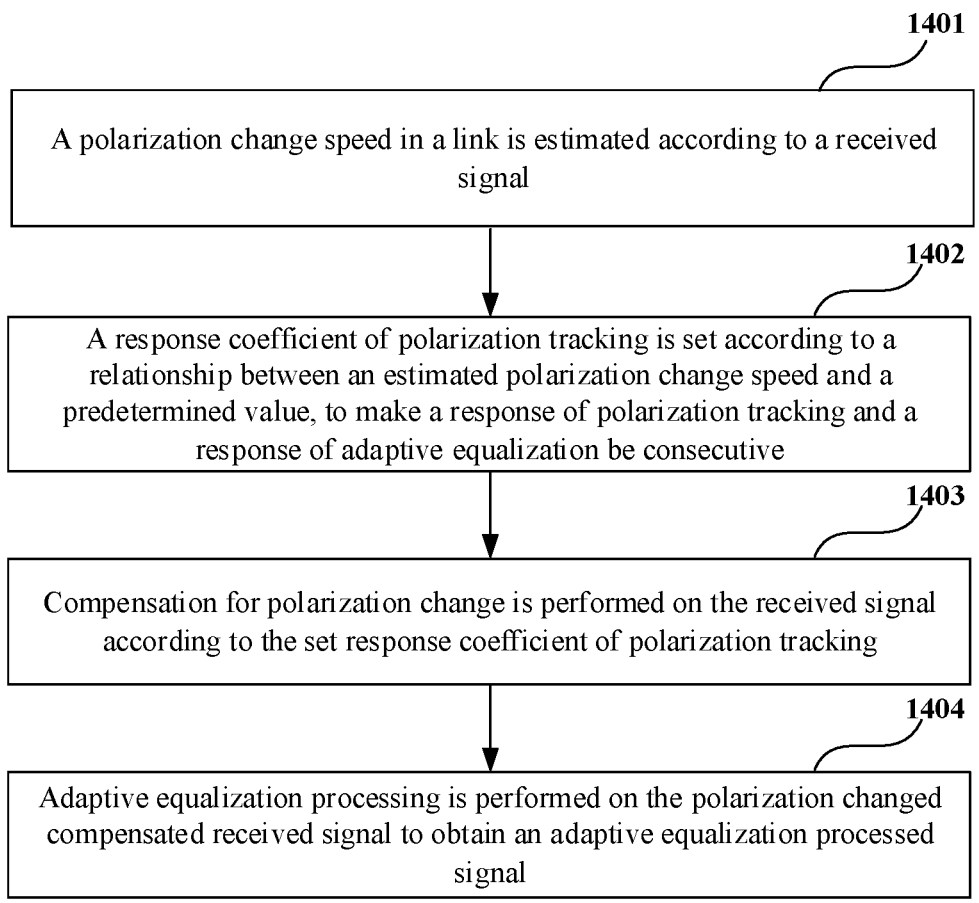
FIG. 14 is a schematic diagram of the processing method for a received signal according to an embodiment of this disclosure.

FIG. 14 is a schematic diagram of the processing method for a received signal of Embodiment 5 of this disclosure. As shown in FIG. 14, the method includes:

Operation 1401: a polarization change speed in a link is estimated according to a received signal;

Operation 1402: a response coefficient of polarization tracking is set according to a relationship between an estimated polarization change speed and a predetermined value, to make a response of polarization tracking and a response of adaptive equalization be consecutive;

Operation 1403: compensation for polarization change is performed on the received signal according to the set response coefficient of polarization tracking; and Operation 1404: adaptive equalization processing is performed on the polarization changed compensated received signal to obtain an adaptive equalization processed signal.

In this embodiment, reference may be made to implementations of the units in Embodiment 2 for execution of operations 1401-1404, which shall not be described herein any further.

It can be seen from the above embodiment that the response coefficient of polarization tracking is set according to a relationship between the estimated polarization change speed and the predetermined value, to make the response of polarization tracking and the response of adaptive equalization be consecutive. Thus, fast polarization changes may be tracked and degradation of performance of the system may be avoided.

An embodiment of this disclosure provides a computer readable program, which, when executed in a polarization change tracking apparatus or an optical receiver, will cause a computer to carry out the polarization change tracking method as described in Embodiment 4 in the polarization change tracking apparatus or the optical receiver.

An embodiment of this disclosure provides a computer storage medium, including a computer readable program, which will cause a computer to carry out the polarization change tracking method as described in Embodiment 4 in a polarization change tracking apparatus or an optical receiver.

An embodiment of this disclosure provides a computer readable program, which, when executed in a processing apparatus for a received signal or an optical receiver, will cause a computer to carry out the processing method for a received signal as described in Embodiment 5 in the processing apparatus for a received signal or the optical receiver.

An embodiment of this disclosure provides a computer storage medium, including a computer readable program, which will cause a computer to carry out the processing method for a received signal as described in Embodiment 4 in a processing apparatus for a received signal or an optical receiver.

Carrying out the polarization change tracking method or the processing method for a received signal in the polarization change tracking apparatus or the optical receiver described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the operations shown in FIG. 13. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 1 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Following supplements are further disclosed in the embodiments of this disclosure.

1. A polarization change tracking method, the method including:

estimating a polarization change speed in a link according to a received signal;

setting a response coefficient of polarization tracking according to a relationship between an estimated polarization change speed and a predetermined value, to make a response of polarization tracking and a response of adaptive equalization be consecutive; and performing compensation for polarization change on the received signal according to a set response coefficient of polarization tracking.

2. The method according to supplement 1, wherein, the response coefficient of polarization tracking contains a first part adapted to the response of adaptive equalization and a second part adapted to a polarization change in the link.

3. The method according to supplement 1 or 2, wherein the setting a response coefficient of polarization tracking according to a relationship between an estimated polarization change speed and a predetermined value, to make a response of polarization tracking and a response of adaptive equalization be consecutive, includes:

setting the response coefficient of the polarization tracking to be an initial coefficient of polarization tracking when the polarization change speed is less than the predetermined value;

setting the response coefficient of polarization tracking to include the initial coefficient, a first link response coefficient and a second link response coefficient when the polarization change speed is increased to be greater than or equal to the predetermined value, the first link response coefficient being correlated to a moment when the polarization change speed is less than the predetermined value, and the second link response coefficient being correlated to a moment when the polarization change speed is increased to be greater than or equal to the predetermined value; and setting the response coefficient of polarization tracking to include the initial coefficient, the first link response coefficient and a third link response coefficient when the polarization change speed is decreased to be less than the predetermined value, the third link response coefficient being correlated to a moment when the polarization change speed is decreased to be less than the predetermined value.

4. The method according to supplement 3, wherein, the first link response coefficient is an estimated value of a link response at the moment when the polarization change speed is less than the predetermined value, the second link response coefficient is an estimated value of a link response at the moment when the polarization change speed is increased to be greater than or equal to the predetermined value, and the third link response coefficient is an estimated value of a link response at the moment when the polarization change speed is decreased to be less than the predetermined value.

5. The method according to supplement 4, wherein the estimating a polarization change speed in a link includes:

receiving a received signal after a transmit signal is propagated via a link, pilot signals being inserted in the transmit signal, and the pilot signals being located on a plane in a Stokes space;

transforming pilot signals in the received signal from a Jones space into the Stokes space to obtain Stokes vectors of the pilot signals;

calculating a first polarization change matrix of the pilot signals according to the Stokes vectors of the pilot signals; and estimating a polarization change speed of the link according to the first polarization change matrix;

and the estimated value of the link response is determined according to the first polarization change matrix.

6. The method according to supplement 5, wherein the setting a response coefficient of polarization tracking according to a relationship between an estimated polarization change speed and a predetermined value, to make a response of polarization tracking and a response of adaptive equalization be consecutive, includes:

obtaining a response coefficient of polarization tracking of a data signal in the transmit signal according to a set response coefficient of polarization tracking; and the performing compensation for polarization change on the received signal according to a set response coefficient of polarization tracking including performing compensation for polarization change on the received signal according to the set response coefficient of polarization tracking and the response coefficient of polarization tracking of the data signal in the transmit signal.

7. The method according to supplement 6, wherein the obtaining a response coefficient of the polarization tracking based on a data signal in the transmit signal according to the response coefficient of polarization tracking based on the pilot signal includes:

determining the response coefficient of polarization tracking of a data signal between the adjacent pilot signals according to response coefficients of polarization tracking set based on the adjacent pilot signals, or determining the response coefficient of polarization tracking of a data signal between adjacent pilot signals according to a response coefficient of polarization tracking set based on a former pilot signal in the adjacent pilot signals.

8. The method according to supplement 3, wherein the method further includes:

when the polarization change speed is decreased to be less than the predetermined value, changing the response coefficient of the polarization tracking into the initial coefficient at a speed below a predetermined speed.

9. The method according to supplement 1, wherein, the predetermined value is determined according to a tracking capability of adaptive equalization and a requirement on a code error rate when a fast polarization change occurs.

10. A processing method for a received signal, wherein the method includes:

estimating a polarization change speed in a link according to a received signal;

setting a response coefficient of polarization tracking according to a relationship between an estimated polarization change speed and a predetermined value, to make a response of polarization tracking and a response of adaptive equalization be consecutive;

performing compensation for polarization change on the received signal according to the set response coefficient of polarization tracking; and performing adaptive equalization processing on the polarization changed compensated received signal to obtain an adaptive equalization processed signal.

What is claimed is:

1. An optical receiver, comprising:
a receiver configured to receive a signal after a transmit signal is propagated via a link, pilot signals being inserted in the transmit signal, and the pilot signals being located on a plane in a Stokes space; and
a processor configured to:
transform pilot signals in a received signal from a Jones space into the Stokes space to obtain Stokes vectors of the pilot signals;
calculate a polarization change matrix of the pilot signals according to the Stokes vectors of the pilot signals; and
estimate a polarization change speed of the link according to the polarization change matrix;
set a response coefficient of polarization tracking according to a relationship between an estimated polarization change speed and a predetermined value, to make a response of polarization tracking and a response of adaptive equalization be consecutive; and
perform compensation for polarization change on the received signal according to the set response coefficient of polarization tracking,
wherein the response coefficient of polarization tracking contains a first part in association with the response of adaptive equalization and a second part in association with the polarization change in the link.

2. The optical receiver according to claim 1, wherein the setting of the response coefficient of the polarization tracking comprises:
setting the response coefficient of the polarization tracking to be an initial coefficient of polarization tracking when the polarization change speed is less than the predetermined value;
setting the response coefficient of polarization tracking to comprise the initial coefficient, a first link response coefficient and a second link response coefficient when the polarization change speed increases to be greater than or equal to the predetermined value, the first link response coefficient being correlated to a moment when the polarization change speed is less than the predetermined value, and the second link response coefficient being correlated to a moment when the polarization change speed increases to be greater than or equal to the predetermined value; and
setting the response coefficient of polarization tracking to comprise the initial coefficient, the first link response coefficient and a third link response coefficient when the polarization change speed decreases to be less than the predetermined value, the third link response coefficient being correlated to a moment when the polarization change speed decreases to be less than the predetermined value.

3. The optical receiver according to claim 2, wherein
the first link response coefficient is an estimated value of a link response at the moment when the polarization change speed is less than the predetermined value,
the second link response coefficient is an estimated value of a link response at the moment when the polarization change speed increases to be greater than or equal to the predetermined value, and
the third link response coefficient is an estimated value of a link response at the moment when the polarization change speed decreases to be less than the predetermined value.

4. The optical receiver according to claim 3, wherein the estimated value of the link response is determined according to the polarization change matrix.

5. The optical receiver according to claim 4, wherein the performing of the compensation for polarization change on the received signal comprises:
obtaining a response coefficient of polarization tracking of a data signal in the transmit signal according to a set response coefficient of polarization tracking; and
performing compensation for polarization change on the received signal according to the set response coefficient of polarization tracking and the response coefficient of polarization tracking of the data signal in the transmit signal.

6. The optical receiver according to claim 5, wherein the obtaining of the response coefficient of polarization tracking of the data signal determines the response coefficient of polarization tracking of a data signal between adjacent pilot signals according to response coefficients of polarization tracking set based on the adjacent pilot signals, or determines the response coefficient of polarization tracking of a data signal between adjacent pilot signals according to a response coefficient of polarization tracking set based on a former pilot signal in the adjacent pilot signals.

7. The optical receiver according to claim 2, wherein the processor is further configured to:
change, when the polarization change speed decreases to be less than the predetermined value, the response coefficient of the polarization tracking into the initial coefficient at a speed below a predetermined speed.

8. The optical receiver according to claim 1, wherein the predetermined value is determined according to a tracking capability of adaptive equalization and a requirement on a code error rate when a fast polarization change occurs.

9. An optical receiver, comprising:
a receiver configured to receive a signal after a transmit signal is propagated via a link, pilot signals being inserted in the transmit signal, and the pilot signals being located on a plane in a Stokes space; and
a processor configured to:
  transform pilot signals in a received signal from a Jones space into the Stokes space to obtain Stokes vectors of the pilot signals;
  calculate a polarization change matrix of the pilot signals according to the Stokes vectors of the pilot signals; and
  estimate a polarization change speed of the link according to the polarization change matrix;
  set a response coefficient of polarization tracking according to a relationship between an estimated polarization change speed and a predetermined value, to make a response of polarization tracking and a response of adaptive equalization be consecutive; and
  perform compensation for polarization change on the received signal according to the set response coefficient of polarization tracking, and
  output a polarization changed compensated received signal; and
an adaptive equalizer configured to perform adaptive equalization processing on the polarization changed compensated received signal to obtain an adaptive equalization processed signal,
wherein the response coefficient of polarization tracking contains a first part in association with the response of adaptive equalization and a second part in association with the polarization change in the link.

* * * * *